US010564930B2

(12) United States Patent
Kulkarni et al.

(10) Patent No.: US 10,564,930 B2
(45) Date of Patent: Feb. 18, 2020

(54) COMPUTING DEVICE PERFORMANCE OF LOW PRECISION ARITHMETIC FUNCTIONS WITH ARRAYS OF PRE-CALCULATED VALUES

(71) Applicant: Microsoft Technology Licensing, LLC, Redmond, WA (US)

(72) Inventors: Saurabh Mohan Kulkarni, Redmond, WA (US); Marc Tremblay, Clyde Hill, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 3 days.

(21) Appl. No.: 15/949,048

(22) Filed: Apr. 9, 2018

(65) Prior Publication Data

US 2019/0310826 A1   Oct. 10, 2019

(51) Int. Cl.
*G06F 7/38* (2006.01)
*G06F 1/03* (2006.01)

(52) U.S. Cl.
CPC ...................... *G06F 7/38* (2013.01)

(58) Field of Classification Search
None
See application file for complete search history.

(56) References Cited

U.S. PATENT DOCUMENTS

| 6,128,638 | A * | 10/2000 | Thomas | G06F 1/0307 |
| | | | | 708/512 |
| 6,900,747 | B2 * | 5/2005 | Lee | H03M 7/30 |
| | | | | 341/106 |
| 8,190,669 | B1 | 5/2012 | Oberman et al. | |
| 2002/0026468 | A1 * | 2/2002 | Miyasaka | G06F 1/0307 |
| | | | | 708/606 |
| 2004/0044710 | A1 | 3/2004 | Harrison et al. | |
| 2009/0003446 | A1 | 1/2009 | Wu et al. | |
| 2013/0054665 | A1 * | 2/2013 | Felch | G06F 1/0307 |
| | | | | 708/517 |
| 2018/0018146 | A1 * | 1/2018 | Ebergen | G06F 7/523 |

OTHER PUBLICATIONS

"International Search Report and Written Opinion Issued in PCT Application No. PCT/US19/023957", dated May 31, 2019, 11 Pages.

* cited by examiner

*Primary Examiner* — David H Malzahn
(74) *Attorney, Agent, or Firm* — Watson Patents, PLC; Vladan M. Vasiljevic (57) ABSTRACT

Reduced precision computer number formats inherently limit the quantity of discrete numeric values that can be represented. Therefore, the solution values of an arithmetic function, for each numeric value that is individually and uniquely expressible utilizing such a reduced precision computer number format, can be precomputed since the quantity of unique solution values can be limited to a quantity that can be conveniently stored, such as in an array. Subsequently, rather than computing the solution value of such an arithmetic function, for a given input value, the precomputed array can be referenced and a solution value corresponding to the given input value can be read from the array. Reading numeric values from an array can be substantially faster than computing solution values of a computationally-expensive arithmetic function.

20 Claims, 8 Drawing Sheets

COMPUTING DEVICE PERFORMANCE OF LOW PRECISION ARITHMETIC FUNCTIONS WITH ARRAYS OF PRE-CALCULATED VALUES

BACKGROUND

Some arithmetic functions can be very expensive to compute on conventional computer processing units (CPUs), taking tens or sometimes hundreds of clock cycles to compute. For example, an exponential function, such as computing the numeric value of Euler's number raised to a power specified by an input numeric value can require multiple processor cycles and can, thereby, take a substantially longer amount of time to compute than other mathematical functions, such as a multiplication function, which can often be accomplished using highly optimized circuits in Arithmetic and Logic Units (ALUs) on modern CPUs. Often times, such specialized arithmetic functions without optimizations in ALUs, significantly slow down the overall execution of programs, in accordance with Ahmdal's Law. Speeding up the execution of such functions can therefore result in significant overall efficiency benefits in terms of program run time.

Computing devices express numeric values utilizing standardized computer number formats, either integer or floating point. For example, the INT8 format utilizes eight bits to represent one of 255 integers ranging from −128 to 127. The precision and dynamic range of the numeric representation depends upon the number of bits used in the representation. For example, the INT8 format cannot be utilized to represent a fractional number, nor can it be utilized to represent any number larger than 127 or smaller than −128. The precision and dynamic range needs of the application determine the numerical format used. For example, a common computer number format is the IEEE single-precision floating-point format which utilizes 32 bits of binary data to represent integers and fractional numeric values. Because the single-precision floating-point format can uniquely identify billions of different numeric values, it can more accurately identify numeric values than, for example the aforementioned INT8 format.

However, utilization of a single-precision floating-point format can require the maintenance and processing of 32 bits of numeric value data at each point in a computation. Hardware requirements (in terms of transistors) in ALUs for computation and memory requirements while operating on numerical formats with higher precision are proportionally higher. Hence, it is a lot more efficient to operate with lower precision when the application can tolerate that. Deep neural networks is one such class of applications where the reduced precision of 16-bit or even 8-bit representations is sufficient to achieve the desired accuracy of results. Examples of such representation formats are the aforementioned INT8 format, a floating-point analog thereof, referred to as FP8, or, commonly, a half-precision floating-point format which utilizes 16, instead of 32, bits of data to represent numeric values. Nevertheless, even with such reduced precision computer number formats, the processing of certain arithmetic functions, such as an exponential function, a logarithmic function, a hyperbolic tangent function, a sigmoid function, or other similar arithmetic functions can be time-consuming and can require substantial processing resources.

SUMMARY

Reduced precision computer number formats inherently limit the quantity of discrete numeric values that can be represented utilizing the format. In such instances, the output values of an arithmetic function, for each numeric value that is individually and uniquely expressible, can be precomputed since the quantity of unique output values can be limited to a quantity that can be conveniently stored, such as in an array. Subsequently, rather than computing the output value every time such an arithmetic function is invoked, the precomputed array can be referenced and an output value corresponding to the given input value can be read from the array. Reading numeric values from an array can be substantially faster than computing output values of a computationally expensive arithmetic function. Due to the limited precision and dynamic range of lower precision numeric formats, the output values of an arithmetic function for multiple different input values can be the same due to saturation or rounding effects. In such instances, multiple equal numeric values need not be separately stored and, instead, logic circuitry, or the execution of computer-executable instructions, can identify ranges of input numeric values for which the resulting solution values will all be the same due to the limited precision and range of the computer number format, and, in such instances, that resulting solution value can be returned without looking up the entire array. Multiple different computationally intensive arithmetic functions can be precomputed, and their output values can be stored in separate cells of a single row or column, depending on the orientation, of the aforementioned array.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to utilizing precomputed numeric output values to more quickly find the solution to an arithmetic function. Reduced precision computer number formats inherently limit the quantity of discrete numeric values that can be uniquely represented utilizing the format. In such instances, the output values of an arithmetic function, for each numeric value that is individually and uniquely expressible, can be precomputed since the quantity of unique output values can be limited to a quantity that can be conveniently stored, such as in an array. Subsequently, rather than computing the output value when such an arithmetic function is invoked, the precomputed array can be referenced and an output value corresponding to the given input value can be read from the array. Reading numeric values from an array can be substantially faster than computing output values of a computationally expensive arithmetic function. Due to the limited precision and dynamic range of lower precision numeric formats, the output values of an arithmetic function for multiple different input values can be the same due to saturation or rounding effects. In such instances, multiple equal numeric values need not be separately stored and, instead, logic circuitry, or the execution of computer executable instructions, can identify ranges of input numeric values for which the resulting solution values will all be the same due to the limited precision of the computer number format, and, in such instances, that resulting output value can be returned without looking up the entire array. Multiple different computationally intensive arithmetic functions can be precomputed, and their output values can be stored in separate cells of a single row or column, depending on the orientation, of the aforementioned array.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including servers, hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Figure 1:
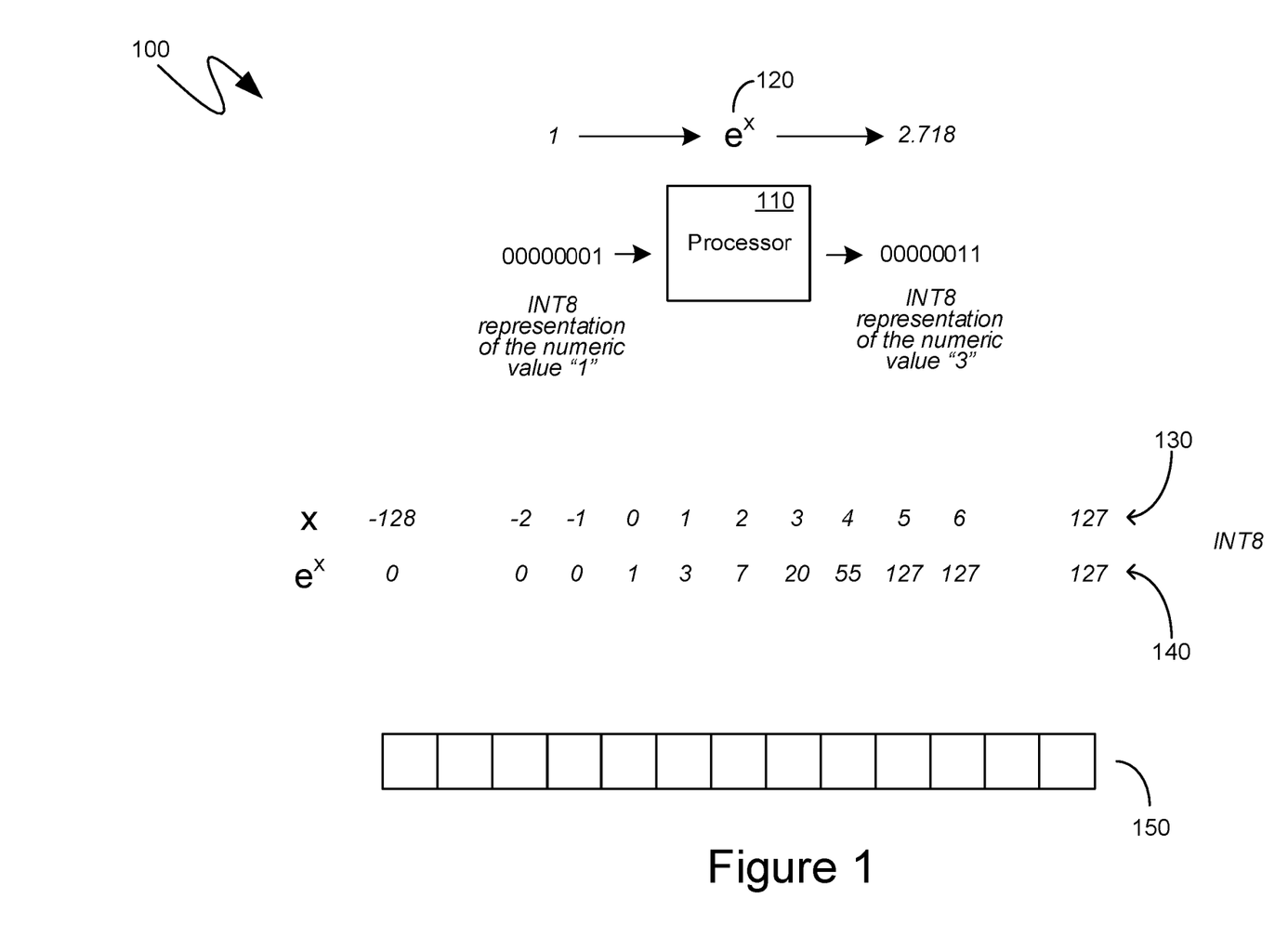
FIG. 1 is a system diagram of an exemplary system for pre-computing numeric solution values to an arithmetic function.

With reference to FIG. 1, an exemplary system 100 is illustrated, providing context for the descriptions below. The exemplary system 100 of FIG. 1 illustrates a computer processing unit, such as the exemplary processor 110, performing the processing necessary to solve an arithmetic function, such as the exemplary exponential function 120 which comprises raising Euler's number to a power specified by an input number. Thus, as illustrated in the exemplary system 100, given an input of "1", the solution to the exponential function 120 is approximately "2.718". However, numeric values are typically represented, by computing devices, as a series of a binary values, or bits, in accordance with a predefined computer number format. For purposes of illustration, the exemplary system 100 of FIG. 1 illustrates the representation of the input and the solution numbers in the INT8 computer number format, which utilizes eight bits to represent integers between the ranges of "−128" and "127". Thus, for example, since the resulting solution, "2.718", is not an integer, the INT8 computer number format would round such a value to the nearest integer expressible by such computer number format, namely the numeric value "3", which, in the INT8 computer number format, would be represented by the binary value "00000011". However, the mechanisms described below are equally applicable to other computer number formats, such as the FP8 computer number format, which still utilizes eight bits of data to represent numeric values, but is capable of representing fractional values, or the FP16 computer number format, also referred to as a "half precision" format, which utilizes 16 bits of data to represent numeric values, including fractional values.

In the INT8 and FP8 computer number formats, only 255 unique numeric values can be expressed, with the INT8 computer number format limiting those 255 unique numeric values to integer values, while the FP8 computer number format includes fractional values in those 255 numeric values. Thus, in either the INT8 or FP8 formats, the possible numeric input values to the arithmetic function 120 would be one of those 255 numeric values, since no other numeric values can be represented by those computer number formats. Accordingly, if the solutions to the arithmetic formula 120 for each of those 255 unique numeric values were precomputed, then no matter what input was provided, the processor 110 would already have access to the solution, and could obtain the solution through a simple lookup, which can be orders of magnitude faster than computationally solving the arithmetic function 120 in real-time depending on the underlying hardware used to perform the computation in real time. In a similar manner, the FP16 format is only capable of expressing 16,535 unique numeric values, with those 16,535 unique numeric values including fractional values. While the quantity of unique numeric values is substantially greater, the mechanisms described herein are equally applicable. For example, all 16,535 solutions to the arithmetic function 120, for all 16,535 possible numeric input values, can be stored in 128 kilobytes or less of memory, which is a sufficiently small amount of computer-readable storage that its utilization for the mechanisms described herein would have minimal impact and cost.

For purposes of illustration and description, references below will be made primarily to the INT8 computer number format strictly for conceptual simplicity and ease of graphical illustration. As indicated, the mechanisms described herein are applicable to any computer number format. Turning back to FIG. 1, the exemplary system 100 shown therein illustrates the range of possible numeric input values 130 given the constraints of the INT8 computer number format in expressing numeric values. For example, the numeric values 130 comprise the number "2" followed immediately by "3". In the INT8 computer number format, "2" and "3" represent a contiguous set of numbers since the INT8 computer number format has no mechanism for expressing any numeric values between the number "2" and the number "3". In other words, the INT8 computer number format cannot express any numeric value that is simultaneously greater than the numeric value "2" and less than the numeric value "3". Accordingly, the possible numeric input values 130 are a contiguous set of numeric values ranging from the minimum numeric value expressible by the INT8 computer number format, namely the numeric value "−128", to the maximum numeric value expressible by the INT8 computer number format, namely the numeric value "127".

According to one aspect, a numeric solution value for each of the numeric input values 130 can be precomputed. In such an instance, as indicated, every possible input will have an already precomputed solution to the arithmetic function 120, enabling the processor 110 to obtain a solution to any possible input, again, given the INT8 computer number format being utilized, by simply performing a lookup, as opposed to actually processing the arithmetic function 120. The numeric solution values 140, shown in FIG. 1, are the numeric solution values for each of the numeric input values 130. For example, as shown in FIG. 1, if the number "0" is provided as input, then the solution to the arithmetic function 120 is "1" since any number raised to a power of "0" is "1". If the number "1" is provided as input, then the solution to the arithmetic function 120 is approximately "2.718", as described previously, which, as also described previously, will be represented by the numeric solution value "3" in the INT8 computer number format. For small input numbers, the solution to the arithmetic function 120 will be very close to "0". Since the INT8 computer number format is incapable of expressing any numeric values between "0" and "1", any solution whose result is less than one half will be rounded down to "0". Thus, as illustrated in FIG. 1, the numeric solution values 140 are all "0" for all numeric input values from the minimum numeric input value expressible by the INT8 computer number format, namely "−128", all the way until an input value of "0", as detailed above. Such rounding can result in the same numeric solution values being generated from multiple different numeric input values, depending on the arithmetic function. In a similar manner, for large input numbers, the solution to the arithmetic function 120 will be larger than the maximum expressible numeric value that is expressible by the INT8 computer number format, namely "127". For example, the solution to the arithmetic function 120 for an input value of "5" is approximately "148.413". However, since the INT8 computer number format cannot express any numbers greater than 127, such a solution can only be expressed as "127" in the INT8 computer number format. As a result, the numeric solution values 140 are all "127" for all numeric input values between "5" and the maximum numeric input value expressible by the INT8 computer number format, namely "127". Such saturation can result in the same numeric solution values being generated from multiple different input numeric values, depending on the arithmetic function.

Once the numeric solution values 140 have been precomputed, they can be stored into an array, such as the exemplary array 150. Subsequently, should the processor 110 be requested to perform the arithmetic function 120, the processor 110 can do so by simply looking up the appropriate numeric solution value from the array 150, given the numeric input value for which the arithmetic function 120 was requested to be performed.

Figure 2:
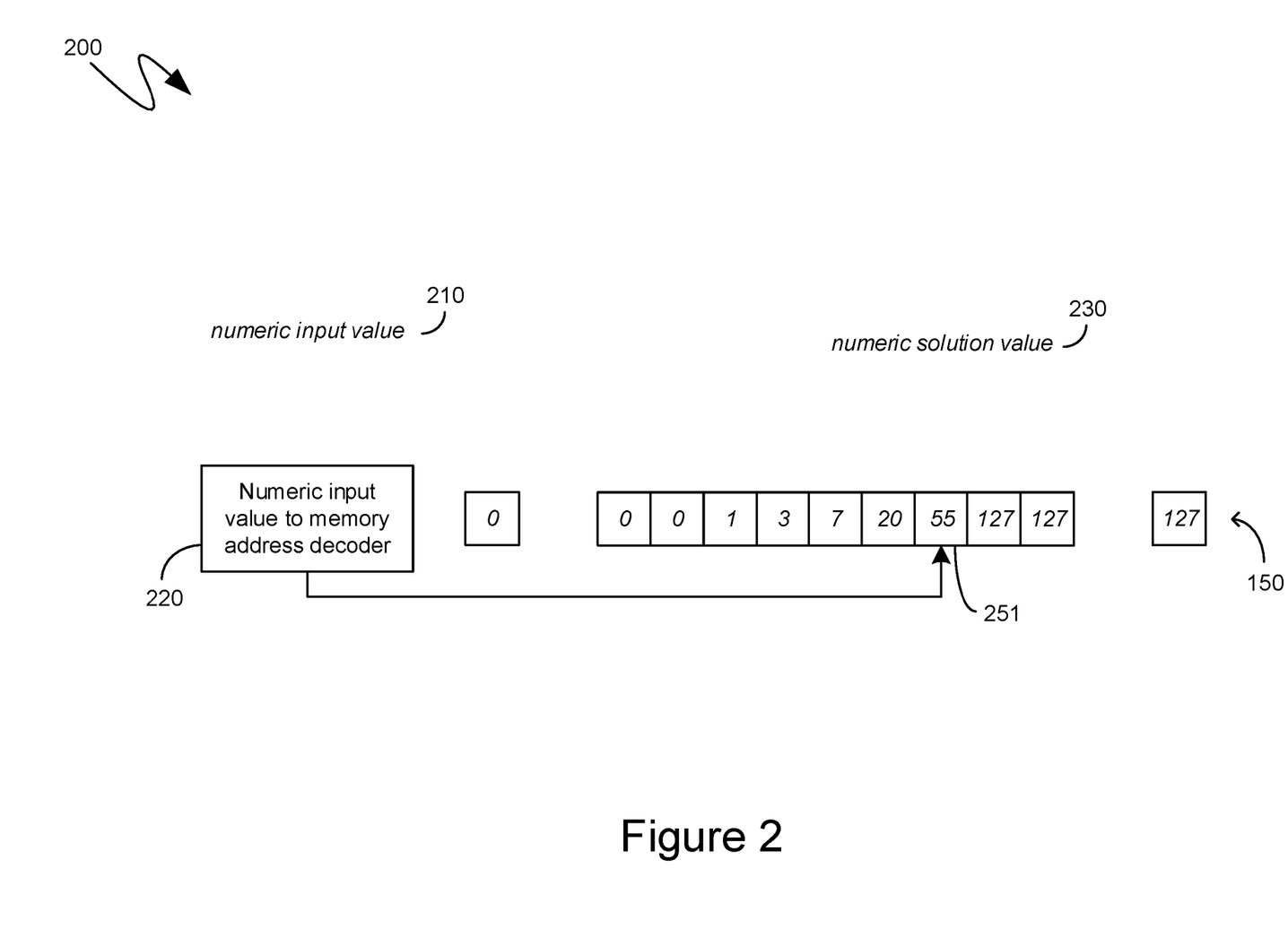
FIG. 2 is a system diagram of an exemplary system utilizing pre-computed numeric solution values to more quickly find the solution to an arithmetic function.

Turning to FIG. 2, the exemplary system 200 shown therein illustrates an exemplary mechanism by which such a lookup can occur. More specifically, a processor can be requested to perform an arithmetic function given an input value, such as, for example, calculating the solution to Euler's number raised to a power specified by the numeric input value. The solution to such an arithmetic function can have been precomputed and stored into an array, such as the exemplary array 150. According to one aspect, one or more memory locations of the array can be mapped to numeric input values such that a memory location mapped to a specific numeric input value identifies the memory location of the cell of the array 150 that contains the solution to the arithmetic function, given that numeric input value. For example, each cell of the array can be eight bits in order to accommodate the eight-bit values, in accordance with the INT8 computer number format, being stored therein. Continuing with such an example, if the first cell of the array, corresponding to an input value of "−128", and containing the result of the arithmetic function given such an input value, commences at memory location "000000001", then the second cell, corresponding to an input value of "−127", since such is the next subsequent possible input value given the INT8 computer number format, can commence at memory location "000000002", assuming byte addressable memory. In such a manner, the memory location of any cell can be decoded based upon knowledge of the size of each cell, the memory location of the first cell of the exemplary array 150, and the quantity of numeric input values between the numeric input value corresponding to the first cell and the numeric input value for which the solution to the arithmetic function is requested.

Such a decoding of memory addresses of individual cells of the array 150 based on a numeric input value can be performed by the decoder 220. Thus, for example, upon receipt of a request to perform the arithmetic function 120 (shown in FIG. 1) given a numeric input value 210, a processor can execute the decoder 220 and identify the memory address of a cell of the array 150 in which the previously computed numeric solution value, which is the solution to the arithmetic function given the numeric input value 210, is stored. In the example illustrated by the system 200 of FIG. 2, the numeric input value 210 can have been the number "4", as expressed in the INT8 computer number format. As indicated previously, the INT8 computer number format can uniquely express 255 integers ranging from "−128" to "127". Thus, the number "4" can be the $133^{rd}$ largest integer expressible by the INT8 computer number format, and, if the solutions to the arithmetic function 120 for each of the 255 integers were stored into the array 150 in order from the smallest numeric input value resulting in such a solution, to the largest numeric input value resulting in such a solution, then the solution to the arithmetic function 120, for the number "4", can be stored in the $133^{rd}$ cell of the array 150. The decoder 220 can calculate the memory address of such a cell, such as in the manner detailed previously, and utilizing such a memory address a processor can fetch the data that is stored in that cell. Thus, as illustrated by the system 200 of FIG. 2, execution of the decoder 220 can identify the cell 251 and the numeric solution value "55", representing the solution to the arithmetic function 120 for the number "4" can be returned as the numeric solution value 230 without a processor having to calculate the arithmetic function.

As indicated previously, for certain arithmetic functions, given the limitations of precision offered by computer number formats, rounding or saturation effects can cause multiple different numeric input values to have the same numeric solution values. For example, as illustrated in FIG. 1, for the exponential arithmetic function 120 shown therein, all numeric input values from "−128" to "−1" result in solutions that round to the number "0" in the INT8 computer number format. Similarly, as also illustrated in FIG. 1, the solutions to that same exponential arithmetic function 120 for numeric input values from "5" to "127" can be numeric values that are so large that saturate to the number "127" in the INT8 computer number format, since the INT8 computer number format is incapable of expressing numeric values greater than "127". According to one aspect, rather than individually storing each "0" numeric solution value for numeric input values between "−128" and "−1", computer-executable logic can instead be utilized to simply detect numeric input values within the range "−128" to "−1" and return the numeric solution value "0" for any such detected numeric input values without performing an array lookup, such as that detailed previously. Similarly, rather than individually storing each "127" numeric solution value for numeric input values between "5" and "127", computer-executable logic can be utilized to detect numeric input values within the range "5" to "127" and return the numeric solution value "127" for any such detected numeric input values, again without performing an array lookup.

Figure 3:
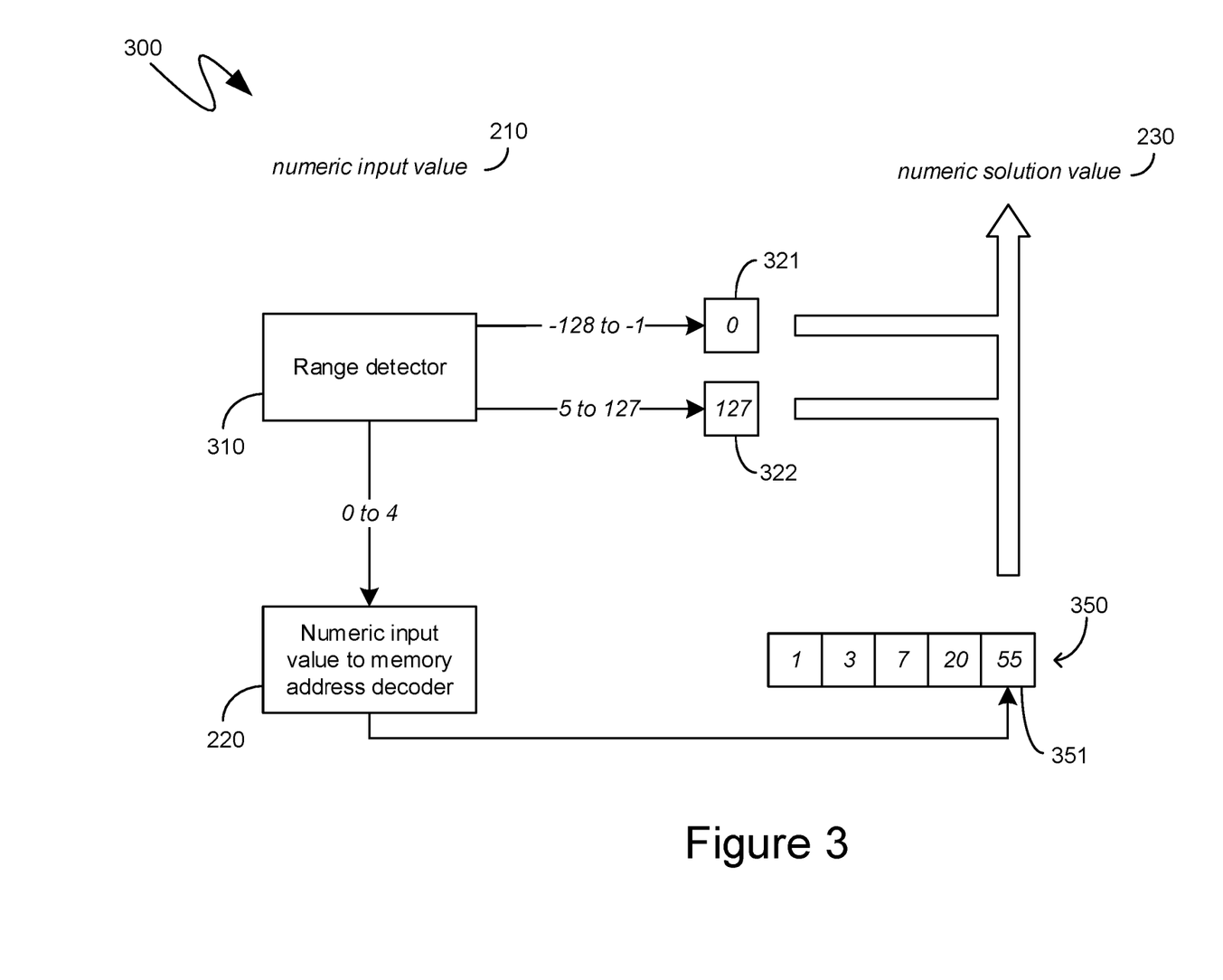
FIG. 3 is a system diagram of another exemplary system utilizing pre-computed numeric solution values to more quickly find the solution to an arithmetic function.

Turning to FIG. 3, the exemplary system 300 shown therein illustrates an exemplary implementation, whereby computer executable-instructions implementing a range detector, such as exemplary range detector 310, can initially be executed upon receiving a request to perform an arithmetic function on a provided numeric input value, such as the exemplary numeric input value 210. The exemplary range detector 310 can determine whether the numeric input value 210 is within certain predefined ranges. Utilizing the example of the exponential arithmetic function 120 shown in FIG. 1 and described in detail above, the range detector 310 can determine whether the numeric input value 210 is within a first range of "−128" to "1", a second range of "5" to "127", or a third range of "0" to "4". As illustrated in FIG. 3, if the range detector 310 determines that the numeric input value 210 is, for example, within the first range, the range detector 310 can return, as the numeric solution value 230, a value of "0", which can be retained in a cell, such as exemplary cell 321, of an array, such as exemplary array 350, or can be hardcoded into the computer-executable instructions of the range detector 310. Similarly, if the range detector 310 determines that the numeric input value 210 is within second range, the range detector 310 can return, as the numeric solution value 230, a value of "127", which, again, can be retained in a cell, such as exemplary cell 322, or can be hardcoded into the range detector 310.

Conversely, if the range detector 310 determines that the numeric input value 210 is in the third range, processing can proceed as detailed above. More specifically, the range detector 310 can trigger the invocation of the decoder 220, which can then identify a memory address of a cell, such as the exemplary cell 351, in the array 350, having stored therein the solution to the arithmetic function for the numeric input value 210. As can be seen from the exemplary system 300 of FIG. 3, however, the array 350 can be substantially shorter, and thereby occupy substantially less memory, than the array 250 shown in FIG. 2. In the specific example illustrated in FIG. 3, because numeric input values between "−128" and "−1" resulted in solutions to the arithmetic function that were rounded to a numeric solution value of "0", and because numeric input values between "5" and "127" resulted in solutions to the arithmetic function that saturated a numeric solution value of "127", the exemplary array 350 need only comprise the pre-calculated solutions for the five numeric input values of "0", "1", "2", "3" and "4". Consequently, the decoder 220 can continue to operate in a manner identical to that described above, except that the starting memory address of the exemplary array 350 can correspond to the memory address of the cell storing the numeric solution value of the first one of the five numeric input values identified previously for which a lookup into such an array structure will be performed to return the numeric solution value 230. Similarly, the subsequent memory addresses of the subsequent cells of the array 350 can be determined by incrementing that initial starting memory address by, with such incrementing corresponding to a quantity of numeric input values that the received numeric input value, such as exemplary numeric input value 210, is greater than the initial starting numeric input value of "0", to which the solution of the arithmetic function given such a numeric input value of "0" is stored in the first cell of the array 350. Thus, for example, if the numeric input value 210 was "4", then the range detector 310 can identify it as being within the range of "0" to "4", and can, thereby, invoke the decoder 220, which can identify a starting memory address of the cell 351 by incrementing a known starting memory address of the overall array 350 by four, assuming byte addressable memory, given that the exemplary numeric input value of "4" is four numeric values greater than the numeric input value of "0" whose corresponding solution to the arithmetic function is stored in the first cell of the array 350.

Figure 4:
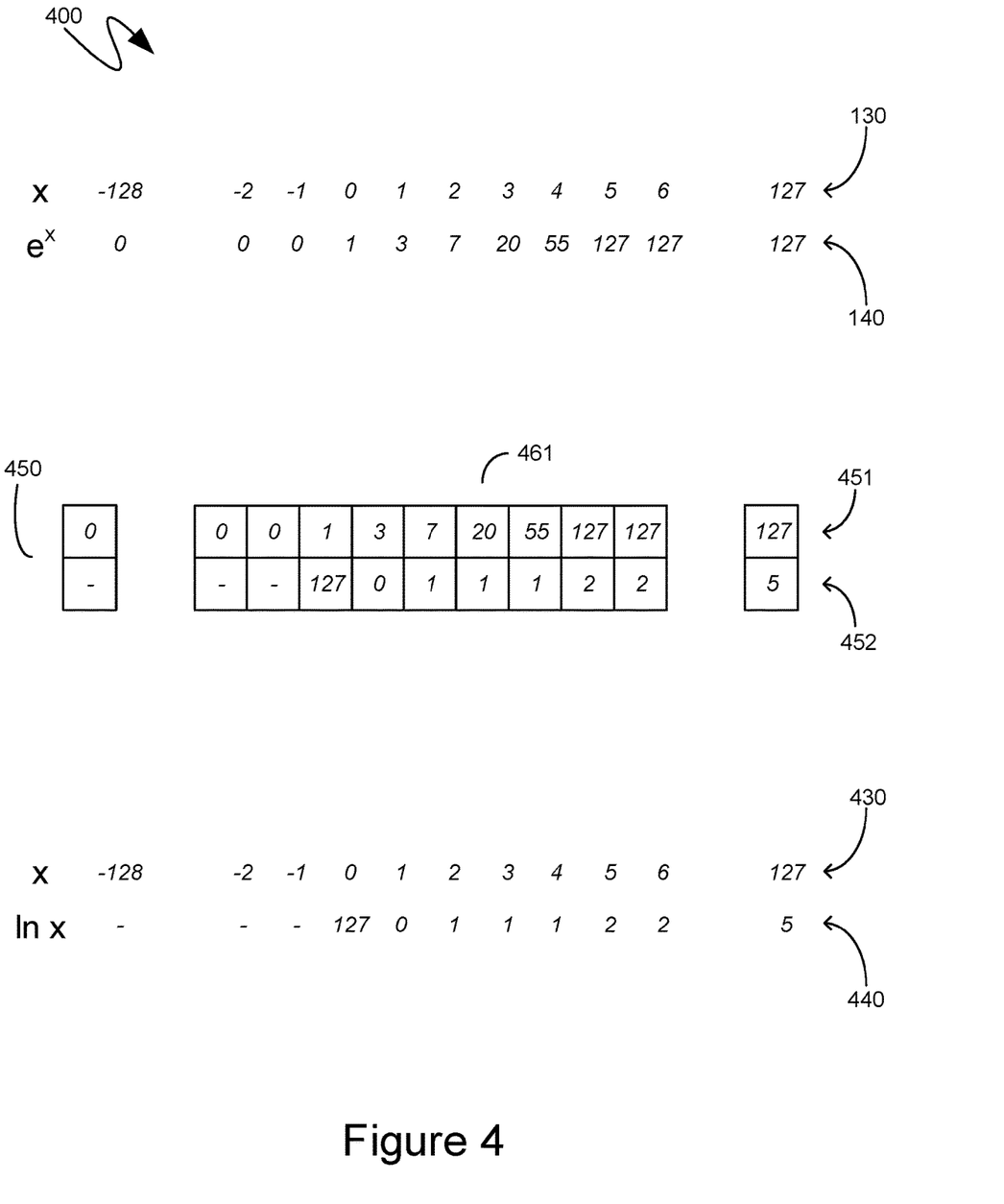
FIG. 4 is a system diagram of another exemplary system for pre-computing numeric solution values to an arithmetic function.

Turning to FIG. 4, the exemplary system 400 shown therein illustrates how multiple different arithmetic functions can have solutions for them precomputed and stored in a two-dimensional array, such as the exemplary array 450. More specifically, and as shown, numeric input values 130, corresponding to the numeric input values 130 described previously and shown in FIG. 1, can have precomputed corresponding solutions to the arithmetic function of Euler's number raised for power specified by the numeric input values 130, with such precomputed corresponding solutions being the numeric solution values 140, which were also described previously and shown in FIG. 1. Such numeric solution values 140 can be stored in an array, such as the exemplary array 450. More specifically, such numeric solution values 140 can be stored in a single row of the array 450, such as the exemplary row 451.

Another arithmetic function that can have solutions precomputed for it can be a logarithmic function, such as the natural logarithm of an input. A range of numeric input values 430 can, like the numeric input values 130, be all of the numeric values that are representable utilizing the computer number format. In the example illustrated in FIG. 4, the INT8 computer number format is utilized, with the possible numeric input values 430 being a contiguous range of integers between "−128" and "127" as shown. For each of the numeric input values 430, a solution to the arithmetic function determining the natural logarithm of the input value can be precomputed. For example, the natural logarithm of the number "1" can be computed to be the number "0", the natural logarithm of the number "2" can be computed to be approximately "0.693", which is closest to the value "1" the INT8 computer number format. In such a manner, numeric solution values 440, comprising a numeric solution value to the arithmetic function given each one of the possible numeric input values 430, can be precomputed.

The numeric solution values 440 can themselves be stored in an array, such as the exemplary array 450. According to one aspect, the numeric solution values 440 can be stored in a row of the array 450, such as the exemplary row 452. The storage of the numeric solution values 440 in the exemplary row 452 can be aligned with the storage of the numeric solution values 140, in the exemplary row 451, such that the cells of a single column, such as the exemplary column 461, comprise the solutions to various different arithmetic functions given the same numeric input value. For example, the exemplary column 461 can comprise a cell, from the row 451, containing the solution to the arithmetic function of Euler's number raised to an exponent, where the input value of that function is "3". Correspondingly, the exemplary column 461 can comprise a cell, from the row 452, containing the solution to the arithmetic function of the natural log of an input value, where that value is, again, "3". Although described in terms of rows of numeric solution values and columns of the same input value, the two-dimensional array 450 could be oriented in an orthogonal manner, where the numeric solution values are arranged in columns and individual rows contain the numeric solution values of different functions given a same input numeric value.

A decoder, such as that described previously, can similarly be utilized with a two-dimensional array. For example, if each row of the array consists of 255 separate cells, corresponding to the 255 different numeric values expressible by, for example, the INT8 computer number format, then equivalent cells, such as the cells in a same column, can be 255 memory addresses apart, assuming the cells of the array are stored sequentially and are byte addressable. Thus, a decoder can identify an appropriate cell within a first row, and then increment the corresponding memory address based on a quantity of rows "down" the same column until reaching the row corresponding to the particular arithmetic function for which the result, given the numeric input value, is desired.

Figure 5:
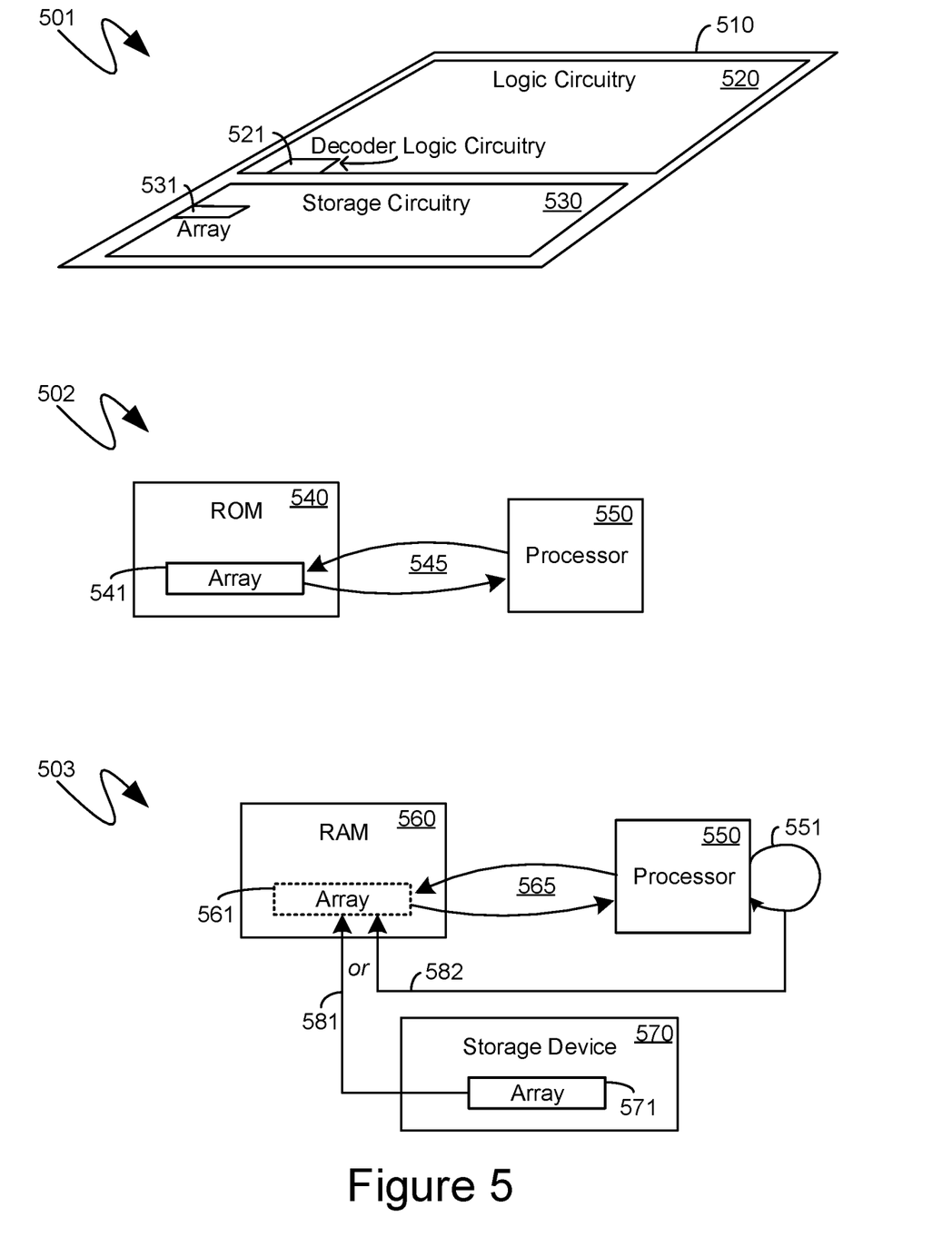
FIG. 5 is a block diagram of an exemplary implementation of a precomputed array of numeric solution values to more quickly find the solution to an arithmetic function.

Turning to FIG. 5 exemplary implementations of the arrays and logic functionality described are illustrated in the systems 501, 502 and 503 shown therein. Turning first to the system 501, the exemplary system 501 illustrates a microprocessor 510, such as a customized microprocessor, which can include logic circuitry 520 and on-chip storage circuitry 530. According to one aspect, the logic circuitry 520 can include decoder logic circuitry 521 that can comprise logic gates, that can implement the functionality of the decoder described previously. Similarly, the storage circuitry 530 can comprise computer-readable data stored in at least a portion 531 of the storage circuitry 530 that can comprise the two-dimensional array comprising the numeric solution values described previously. The computer-readable data of the two-dimensional array can either be permanently stored as part of the storage circuitry 530, or can be read into the storage circuitry 530 from a non-volatile computer-readable storage medium, or can be generated as part of a startup sequence of the microprocessor 510. Combinations of the above mechanisms for storing, onto the storage circuitry 530, the computer readable data of the two-dimensional array can be likewise utilized.

The exemplary system 502, also shown in FIG. 5, illustrates another implementation wherein the computer-readable data comprising the two-dimensional array can be stored as data 541 on a Read-Only Memory (ROM) 540 implemented on the processor die and accessed therefrom by a processor, such as the exemplary processor 550, when required, as illustrated by the bidirectional communications 545.

The exemplary system 503, shown in FIG. 5, illustrates another implementation wherein the computer-readable data comprising the two-dimensional array can be stored as data 571 on a storage device 570, such as a hard disk drive, or other like storage media, and then read into memory, such as the exemplary Random Access Memory (RAM) 560, as the data 561, as illustrated by the arrow 581. Alternatively, or in addition, the data 561 of the two-dimensional array, as stored in the RAM 560, can be generated on-the-fly by the processor 550, as illustrated by the compute actions 551, and then stored in the RAM 560, as illustrated by the arrow 582. Subsequently, when required, such data 561 can be obtained from the RAM 560 by the processor 550 as illustrated by the bidirectional communications 565.

Figure 6:
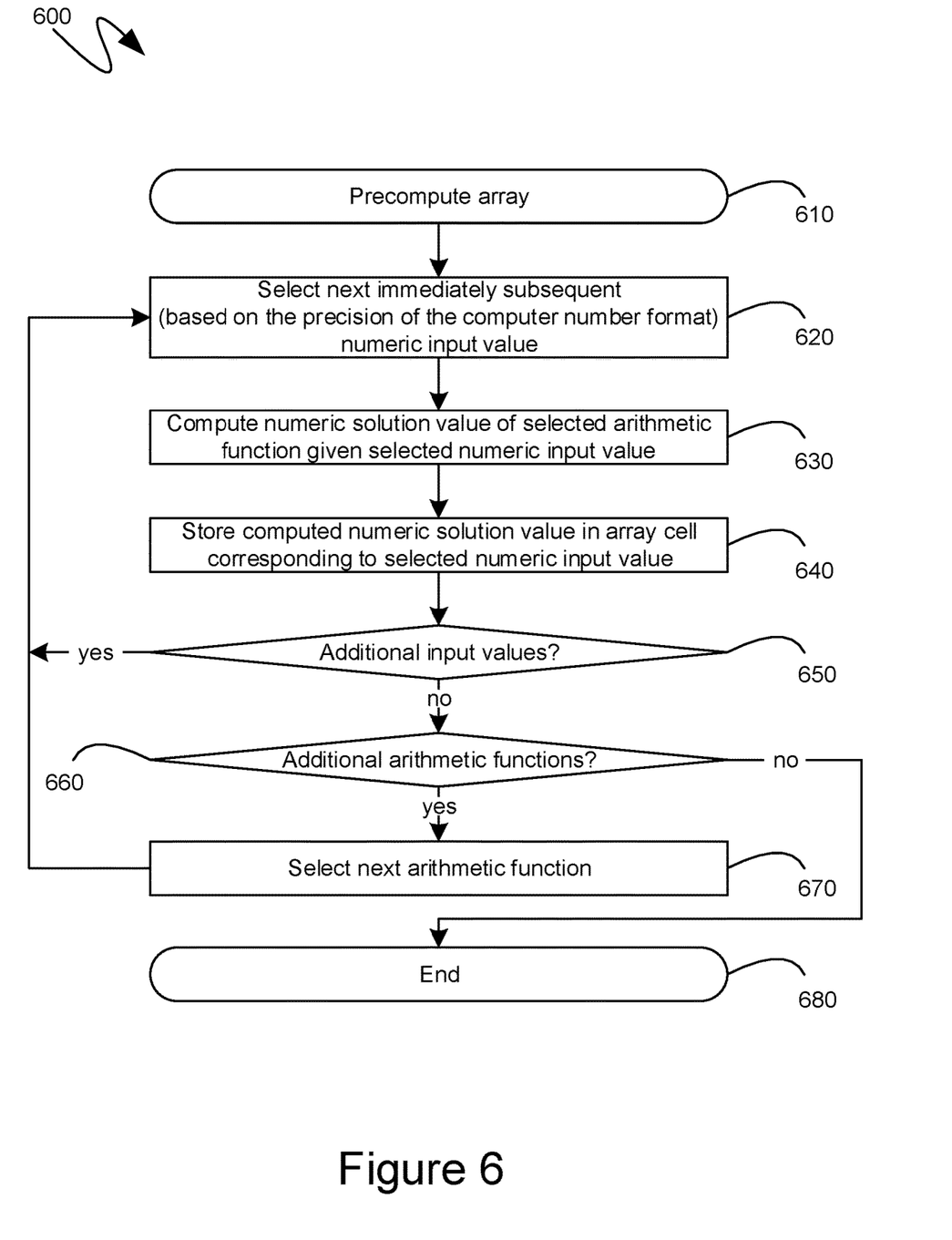
FIG. 6 is a flow diagram of an exemplary series of steps by which an array of numeric solution values to one or more arithmetic functions can be precomputed.

Turning to FIG. 6, the flow diagram 600 shown therein illustrates an exemplary series of steps by which numeric solution values to one or more arithmetic functions can be precomputed. The generation of such a pre-compute array can commence at step 610, and, at step 620, the next immediately subsequent numeric input value can be selected, such that repeated operation of the step 620 can result in a contiguous set of numeric input values being selected. At step 630, a numeric solution value for the selected arithmetic function, given the numeric input value of step 620, can be computed. The computed value of step 630 can then be stored in an array at step 640, such as in the manner detailed previously. At step 650 processing can loop back to step 620 so long as additional numeric input values, representable by the computer number format, remain for which a numeric solution value has not yet been computed. Once the repeated operation of steps 620 through 640 have selected all possible numeric input values representable by the computer number format and have calculated the corresponding numeric solution values, processing can proceed to step 660 at which point, if there are additional arithmetic functions whose solutions are to be precomputed, then processing can proceed to step 670 and the next such arithmetic function can be selected, with processing then returning to step 620 to repeat the performance of steps 620 through 650 with such a newly selected arithmetic function. Conversely, if, at step 660, no additional arithmetic functions remain to have their solutions precomputed, then the relevant processing can end at step 680.

Figure 7:
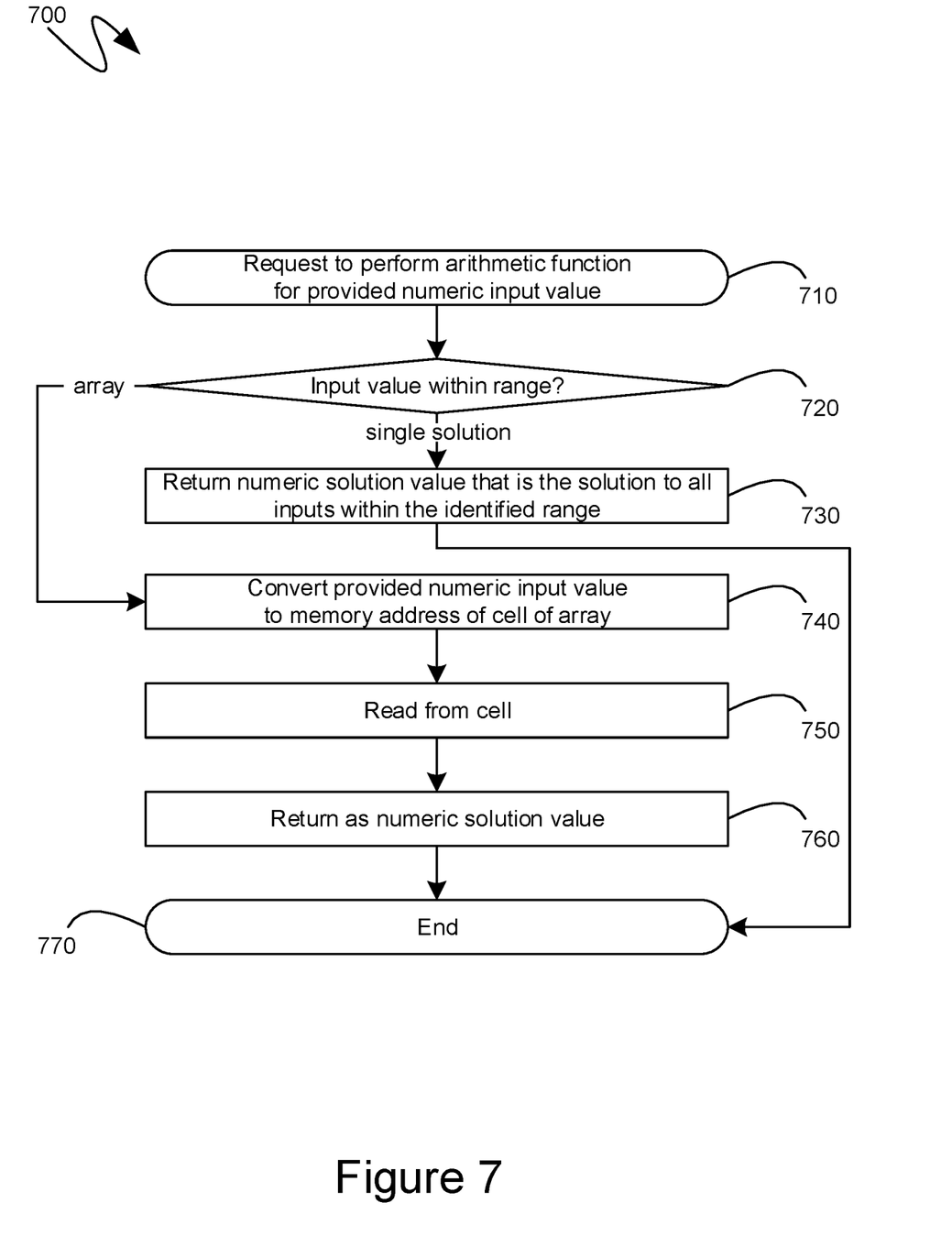
FIG. 7 is flow diagram of an exemplary series of steps by which an array of precomputed numeric solution values can be utilized to more quickly find the solution to an arithmetic function.

Turning to FIG. 7, the flow diagram 700 shown therein illustrates an exemplary series of steps by which numeric solution values to arithmetic functions can be determined through array lookups instead of actual computation of the solutions at the requested time. More specifically, at step 710, a request can be received by a processor to perform an arithmetic function for a provided numeric input value. Instead of processing the arithmetic function to generate a numeric solution value, the processor can instead determine, such as at step 720, a range within which the provided numeric input value falls. If, at step 720, it is determined that the provided numeric input value falls within a range of input values whose corresponding solutions to the arithmetic function are all a single numeric solution value, then such a numeric solution value can be returned at step 730, and the relevant processing can end at step 770. Conversely, if, at step 720 is determined that the numeric input value is within a range represented by an array, processing can proceed to step 740 where the numeric input value can be converted to the memory address of a cell of the array that contains the numeric solution value for the requested arithmetic function, given the provided numeric input value received at step 710. Subsequently, at step 750 such a numeric solution value can be read from the cell whose memory address was determined at step 740, and, at step 760, such a value can be returned as the numeric solution value. The relevant processing can then end at step 770.

Figure 8:
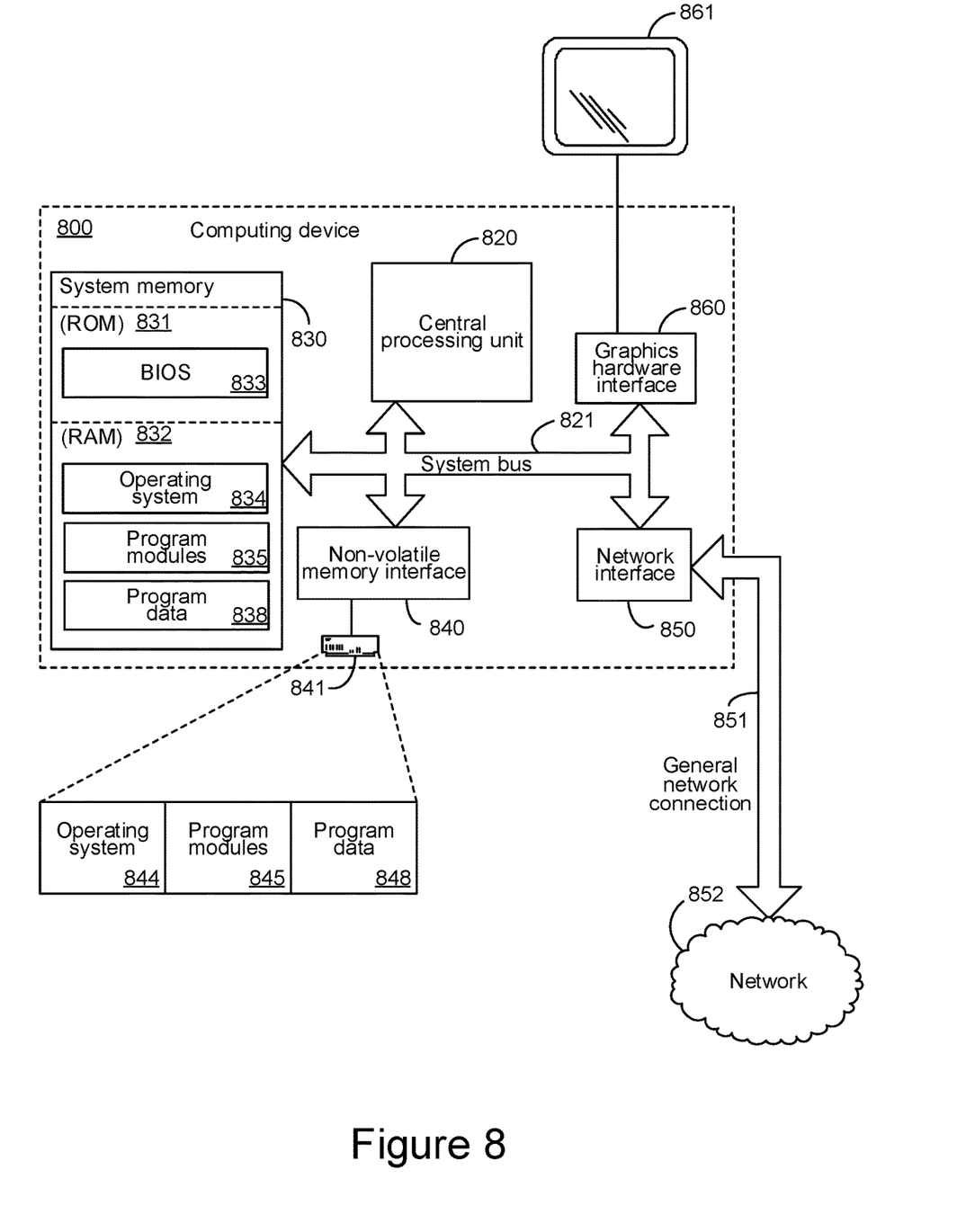
FIG. 8 is a block diagram of an exemplary computing device.

Turning to FIG. 8, an exemplary computing device 800 is illustrated which can perform some or all of the mechanisms and actions described above. The exemplary computing device 800 can include, but is not limited to, one or more central processing units (CPUs) 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. The computing device 800 can optionally include graphics hardware, including, but not limited to, a graphics hardware interface 860 and a display device 861, which can include display devices capable of receiving touch-based user input, such as a touch-sensitive, or multi-touch capable, display device. Depending on the specific physical implementation, one or more of the CPUs 820, the system memory 830 and other components of the computing device 800 can be physically co-located, such as on a single chip. In such a case, some or all of the system bus 821 can be nothing more than silicon pathways within a single chip structure and its illustration in FIG. 8 can be nothing more than notational convenience for the purpose of illustration.

The computing device 800 also typically includes computer readable media, which can include any available media that can be accessed by computing device 800 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 800. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer content between elements within computing device 800, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, other program modules 835, and program data 836.

The computing device 800 may also include other removable/non-removable, volatile/nonvolatile computer storage media. By way of example only, FIG. 8 illustrates a hard disk drive 841 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 841 is typically connected to the system bus 821 through a non-volatile memory interface such as interface 840.

The drives and their associated computer storage media discussed above and illustrated in FIG. 8, provide storage of computer readable instructions, data structures, program modules and other data for the computing device 800. In FIG. 8, for example, hard disk drive 841 is illustrated as storing operating system 844, other program modules 845, and program data 846. Note that these components can either be the same as or different from operating system 834, other program modules 835 and program data 636. Operating system 844, other program modules 845 and program data 846 are given different numbers hereto illustrate that, at a minimum, they are different copies.

The computing device 800 may operate in a networked environment using logical connections to one or more remote computers. The computing device 800 is illustrated as being connected to the general network connection 851 (to a network 852) through a network interface or adapter 850, which is, in turn, connected to the system bus 821. In a networked environment, program modules depicted relative to the computing device 800, or portions or peripherals thereof, may be stored in the memory of one or more other computing devices that are communicatively coupled to the computing device 800 through the general network connection 851. It will be appreciated that the network connections shown are exemplary and other means of establishing a communications link between computing devices may be used.

Although described as a single physical device, the exemplary computing device 800 can be a virtual computing device, in which case the functionality of the above-described physical components, such as the CPU 820, the system memory 830, the network interface 860, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 800 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example a method of improving computing device performance of arithmetic functions comprising: generating, for a first set of numeric input values, a first set of numeric solution values, wherein each numeric solution value, in the first set of numeric solution values, is a solution to a first arithmetic function given a specific, unique numeric input value of the first set of numeric input values; storing the first set of numeric solution values into an array such that each cell of the array corresponds to one of the input numeric values, from the first set of numeric input values, and has stored therein a numeric solution value, from the first set of numeric solution values, which is the solution to the first arithmetic function given the corresponding one of the input numeric values; receiving, subsequent to the generating and the storing, a request to perform the first arithmetic function for a first provided numeric input value; identifying a cell of the array corresponding to the first provided numeric input value; and providing, in response to the request, the numeric solution value, from the first set of numeric solution values, that is stored in the identified cell; wherein each numeric input value, of the first set of numeric input values, is represented by a predefined quantity of bits in accordance with a predefined computer number format; and wherein the first set of numeric input values is contiguous such that, given the predefined quantity of bits, the predefined computer number format cannot represent another numeric value between two adjacent input numeric values of the first set of numeric input values.

A second example is the method of the first example, wherein the first set of numeric input values consists of all possible numeric values representable with the predefined quantity of bits by the computer number format.

A third example is the method of the first example, wherein the first set of numeric input values consists of a first subset of all possible numeric values representable with the predefined quantity of bits by the computer number format, the determining only being performed if the first set of numeric input values includes the first provided numeric input value.

A fourth example is the method of the third example, further comprising: providing, in response to the request, a first numeric solution value if a second set of numeric input values includes the first provided numeric input value; wherein the second set of numeric input values consists of a second subset of the all possible numeric values representable with the predefined quantity of bits by the computer number format, the first and second subsets being wholly exclusive of one another; and wherein the provided first numeric solution value is the solution to the first arithmetic function given any one of the second set of numeric input values.

A fifth example is the method of the fourth example, wherein the provided first numeric solution value is one of: a maximum value representable with the predefined quantity of bits by the computer number format, a minimum value representable with the predefined quantity of bits by the computer number format, or zero.

A sixth example is the method of the fourth example, further comprising: providing, in response to the request, a second numeric solution value if a third set of numeric input values includes the first provided numeric input value; wherein the third set of numeric input values consists of a third subset of the all possible numeric values representable with the predefined quantity of bits by the computer number format, the first, second and third subsets all being wholly exclusive of one another; wherein the provided second numeric solution value is the solution to the first arithmetic function given any one of the third set of numeric input values; wherein each of the first set of numeric input values is numericly larger than any of the second set of numeric input values; and wherein each of the first set of numeric input values is numericly smaller than any of the third set of numeric input values.

A seventh example is the method of the first example, wherein the storing the first set of numeric solution values into the array comprises correlating a first memory addresses of a first cell of the array to a first numeric input value whose solution to the first arithmetic function is a first numeric solution value stored in the first cell.

An eighth example is the method of the first example, wherein each numeric solution value, of the first set of numeric solution values, is represented by a second predefined quantity of bits differing from the predefined quantity of bits utilized to represent each numeric input value of the first set of numeric input values.

A ninth example is the method of the first example, further comprising: generating, for the first set of numeric input values, a second set of numeric solution values, wherein each numeric solution value, in the second set of numeric solution values, is a solution to a second arithmetic function given a specific, unique numeric input value of the first set of numeric input values; storing the second set of numeric solution values into the array such that each cell of a portion of the array comprising the second set of numeric solution values corresponds to one of the input numeric values, from the first set of numeric input values, and has stored therein a numeric solution value, from the second set of numeric solution values, which is the solution to the second arithmetic function given the corresponding one of the input numeric values; receiving, subsequent to the generating and the storing, a request to perform the second arithmetic function for a second provided numeric input value; identifying a second cell of the array corresponding to the second provided numeric input value; and providing, in response to the request, the numeric solution value, from the second set of numeric solution values, that is stored in the identified second cell.

A tenth example is the method of the ninth example, wherein either: (1) each column or (2) each row of the array comprises: a first cell having stored therein a first numeric solution value, from the first set of numeric solution values, which is the solution to the first arithmetic function given a first input numeric value, from the first set of numeric input values; and a second cell having stored therein a second numeric solution value, from the second set of numeric solution values, which is the solution to the second arithmetic function given the first input numeric value, from the first set of numeric input values.

An eleventh example is the method of the first example, wherein the first arithmetic function is one of: a logarithm of a numeric input value, an exponentiation of the numeric input value, a hyperbolic of the numeric input value or a sigmoid of the numeric input value.

A twelfth example is a microprocessor comprising: logic circuitry for detecting when a second set of numeric input values includes a first provided numeric input value and, in response, returning a first numeric solution value that is the solution to a first arithmetic function given any one of the second set of numeric input values; and storage circuitry having an array encoded thereon, the array comprising a first set of numeric solution values, wherein each numeric solution value, in the first set of numeric solution values, is a solution to the first arithmetic function given a specific, unique numeric input value of a first set of numeric input values, the first set of numeric solution values being stored in the array such that each cell of the array corresponds to one of the input numeric values, from the first set of numeric input values, and has stored therein a numeric solution value, from the first set of numeric solution values, which is the solution to the first arithmetic function given the corresponding one of the input numeric values; wherein each numeric input value, of the first and second set of numeric input values, is represented by a predefined quantity of bits in accordance with a predefined computer number format, the first set of numeric input values consisting of a first subset of all possible numeric values representable with the predefined quantity of bits by the computer number format and the second set of numeric input values consisting of a second subset of the all possible numeric values representable with the predefined quantity of bits by the computer number format, the first and second subsets being wholly exclusive of one another; and wherein the first set of numeric input values is contiguous such that, given the predefined quantity of bits, the predefined computer number format cannot represent another numeric value between two adjacent input numeric values of the first set of numeric input values; wherein the microprocessor performs the first arithmetic function by receiving the first provided numeric input value, returning the first numeric solution value if the second set of numeric input values includes the first provided numeric input value, identifying a cell of the array corresponding to the first provided numeric input value and returning the numeric solution value that is stored in the identified cell if the first set of numeric input values includes the first provided numeric input value.

A thirteenth example is the microprocessor of the twelfth example, wherein the array is encoded onto the storage circuitry during an initialization of the microprocessor by the microprocessor pre-calculating each numeric solution value, in the first set of numeric solution values.

A fourteenth example is a computing device comprising: one or more processing units; a first computer-readable storage medium having an array encoded thereon, the array comprising a first set of numeric solution values, wherein each numeric solution value, in the first set of numeric solution values, is a solution to a first arithmetic function given a specific, unique numeric input value of a first set of numeric input values, the first set of numeric solution values being stored in the array such that each cell of the array corresponds to one of the input numeric values, from the first set of numeric input values, and has stored therein a numeric solution value, from the first set of numeric solution values, which is the solution to the first arithmetic function given the corresponding one of the input numeric values; and a second computer-readable storage medium comprising computer-executable instructions which, when executed by the one or more processing units, cause the computing device to: receive a request to perform the first arithmetic function for a first provided numeric input value; identify a cell of the array corresponding to the first provided numeric input value; and provide, in response to the request, the numeric solution value, from the first set of numeric solution values, that is stored in the identified cell; wherein each numeric input value, of the first set of numeric input values, is represented by a predefined quantity of bits in accordance with a predefined computer number format; and wherein the first set of numeric input values is contiguous such that, given the predefined quantity of bits, the predefined computer number format cannot represent another numeric value between two adjacent input numeric values of the first set of numeric input values.

A fifteenth example is the computing device of the fourteenth example, wherein the first computer-readable storage medium is a ROM.

A sixteenth example is the computing device of the fourteenth example, wherein the first computer-readable storage medium is a RAM; and wherein further the second computer-readable storage medium comprises further computer-executable instructions which, when executed by the one or more processing units, cause the computing device to read the array from the second computer-readable storage medium and load it into the RAM.

A seventeenth example is the computing device of the fourteenth example, wherein the second computer-readable storage medium comprises further computer-executable instructions which, when executed by the one or more processing units, cause the computing device to: generate, for the first set of numeric input values, the first set of numeric solution values; and store the first set of numeric solution values into the array.

An eighteenth example is the computing device of the fourteenth example, wherein the second computer-readable storage medium comprises further computer-executable instructions which, when executed by the one or more processing units, cause the computing device to: provide, in response to the request, a first numeric solution value if a second set of numeric input values includes the first provided numeric input value; wherein the first set of numeric input values consists of a first subset of all possible numeric values representable with the predefined quantity of bits by the computer number format, the determining only being performed if the first set of numeric input values includes the first provided numeric input value; wherein the second set of numeric input values consists of a second subset of the all possible numeric values representable with the predefined quantity of bits by the computer number format, the first and second subsets being wholly exclusive of one another; and wherein the provided first numeric solution value is the solution to the first arithmetic function given any one of the second set of numeric input values.

A nineteenth example is the computing device of the fourteenth example, wherein one of the processing units comprises logic circuitry for detecting when a second set of numeric input values includes the first provided numeric input value and, in response, returning a provided first numeric solution value that is the solution to a first arithmetic function given any one of the second set of numeric input values; wherein the first set of numeric input values consists of a first subset of all possible numeric values representable with the predefined quantity of bits by the computer number format, the determining only being performed if the first set of numeric input values includes the first provided numeric input value; and wherein the second set of numeric input values consists of a second subset of the all possible numeric values representable with the predefined quantity of bits by the computer number format, the first and second subsets being wholly exclusive of one another.

A twentieth example is the computing device of the fourteenth example, wherein either: (1) each column or (2) each row of the array comprises: a first cell having stored therein a first numeric solution value, from the first set of numeric solution values, which is the solution to the first arithmetic function given a first input numeric value, from the first set of numeric input values; and a second cell having stored therein a second numeric solution value, from a second set of numeric solution values, which is a solution to a second arithmetic function given the first input numeric value, from the first set of numeric input values; wherein each numeric solution value, in the second set of numeric solution values, is the solution to the second arithmetic function given a specific, unique numeric input value of the first set of numeric input values, the second set of numeric solution values also having been stored into the array such that each cell of a portion of the array comprising the second set of numeric solution values corresponds to one of the input numeric values, from the first set of numeric input values, and has stored therein a numeric solution value, from the second set of numeric solution values, which is the solution to the second arithmetic function given the corresponding one of the input numeric values.

As can be seen from the above descriptions, mechanisms for improving the performance of a computing device in generating a solution to an arithmetic function by utilizing an array of precomputed numeric solution values have been presented. In view of the many possible variations of the subject matter described herein, we claim as our invention all such embodiments as may come within the scope of the following claims and equivalents thereto.

We claim:

1. A method of improving computing device performance of arithmetic functions comprising:
   generating, for a first set of numeric input values, a first set of numeric solution values, wherein each numeric solution value, in the first set of numeric solution values, is a solution to a first arithmetic function given a specific, unique numeric input value of the first set of numeric input values;
   storing the first set of numeric solution values into an array such that each cell of the array corresponds to one of the input numeric values, from the first set of numeric input values, and has stored therein a numeric solution value, from the first set of numeric solution values, which is the solution to the first arithmetic function given the corresponding one of the input numeric values;
   receiving, subsequent to the generating and the storing, a request to perform the first arithmetic function for a first provided numeric input value;
   contingent upon the first provided numeric input value being one of the first set of numeric input values, identifying a cell of the array corresponding to the first provided numeric input value and providing, in response to the request, the numeric solution value, from the first set of numeric solution values, that is stored in the identified cell;
   contingent upon the first provided numeric input value being one of a second set of numeric input values, providing a first numeric solution value that is the solution to the first arithmetic function for each of the second set of numeric input values, wherein the first and second sets of numeric input values are wholly exclusive of one another;
   wherein each numeric input value, of the first and second sets of numeric input values, is represented by a predefined quantity of bits in accordance with a predefined computer number format; and
   wherein the first set of numeric input values, and, separately, the second set of numeric input values are contiguous such that, given the predefined quantity of bits, the predefined computer number format cannot represent another numeric value between two adjacent input numeric values of the first set of numeric input values or between two adjacent input numeric values of the second set of numeric input values.

2. The method of claim 1, wherein the provided first numeric solution value is one of: a maximum value representable with the predefined quantity of bits by the computer number format, a minimum value representable with the predefined quantity of bits by the computer number format, or zero.

3. The method of claim 1, further comprising:
   contingent upon the first provided numeric input value being one of a third set of numeric input values, providing a second numeric solution value that is the solution to the first arithmetic function for each of the third set of numeric input values;
   wherein each of the first set of numeric input values is numerically larger than any of the second set of numeric input values; and
   wherein each of the first set of numeric input values is numerically smaller than any of the third set of numeric input values.

4. The method of claim 1, wherein each numeric solution value, of the first set of numeric solution values, is represented by a second predefined quantity of bits differing from the predefined quantity of bits utilized to represent each numeric input value of the first set of numeric input values.

5. The method of claim 1, further comprising:
   generating, for the first set of numeric input values, a second set of numeric solution values, wherein each numeric solution value, in the second set of numeric solution values, is a solution to a second arithmetic function given a specific, unique numeric input value of the first set of numeric input values;
   storing the second set of numeric solution values into the array such that each cell of a portion of the array comprising the second set of numeric solution values corresponds to one of the input numeric values, from the first set of numeric input values, and has stored therein a numeric solution value, from the second set of numeric solution values, which is the solution to the second arithmetic function given the corresponding one of the input numeric values;
   receiving, subsequent to the generating and the storing, a request to perform the second arithmetic function for a second provided numeric input value;
   identifying a second cell of the array corresponding to the second provided numeric input value; and
   providing, in response to the request, the numeric solution value, from the second set of numeric solution values, that is stored in the identified second cell.

6. The method of claim 5, wherein either: (1) each column or (2) each row of the array comprises:
   a first cell having stored therein a first numeric solution value, from the first set of numeric solution values, which is the solution to the first arithmetic function given a first input numeric value, from the first set of numeric input values; and a second cell having stored therein a second numeric solution value, from the second set of numeric solution values, which is the solution to the second arithmetic function given the first input numeric value, from the first set of numeric input values.

7. The method of claim 1, wherein the first arithmetic function is one of: a logarithm of a numeric input value, an exponentiation of the numeric input value, a hyperbolic of the numeric input value or a sigmoid of the numeric input value.

8. A microprocessor comprising:
a first logic circuitry for detecting when a first provided numeric input value is one of a first set of numeric input values and, in response, identifying a cell of an array corresponding to the first provided numeric input value;
a second logic circuitry for detecting when the first provided numeric input value is one of a second set of numeric input values and, in response, returning a first numeric solution value that is the solution to a first arithmetic function given any one of the second set of numeric input values, wherein the first and second sets of numeric input values are wholly exclusive of one another; and
storage circuitry having the array encoded thereon, the array comprising a first set of numeric solution values, wherein each numeric solution value, in the first set of numeric solution values, is a solution to the first arithmetic function given a specific, unique numeric input value of the first set of numeric input values, the first set of numeric solution values being stored in the array;
wherein each numeric input value, of the first and second set of numeric input values, is represented by a predefined quantity of bits in accordance with a predefined computer number format, the first and second subsets being wholly exclusive of one another;
wherein the first set of numeric input values, and, separately, the second set of numeric input values are contiguous such that, given the predefined quantity of bits, the predefined computer number format cannot represent another numeric value between two adjacent input numeric values of the first set of numeric input values or between two adjacent input numeric values of the second set of numeric input values; and
wherein the microprocessor performs the first arithmetic function by receiving the first provided numeric input value, returning the first numeric solution value if the first provided numeric input value is one of the second set of numeric input values, and returning the numeric solution value that is stored in the identified cell if the first provided numeric input value is one of the first set of numeric input values.

9. The microprocessor of claim 8, wherein the array is encoded onto the storage circuitry during an initialization of the microprocessor by the microprocessor pre-calculating each numeric solution value, in the first set of numeric solution values.

10. The microprocessor of claim 8, wherein the provided first numeric solution value is one of: a maximum value representable with the predefined quantity of bits by the computer number format, a minimum value representable with the predefined quantity of bits by the computer number format, or zero.

11. The microprocessor of claim 8, wherein each numeric solution value, of the first set of numeric solution values, is represented by a second predefined quantity of bits differing from the predefined quantity of bits utilized to represent each numeric input value of the first set of numeric input values.

12. The microprocessor of claim 8, further comprising:
a third logic circuitry for detecting when the first provided numeric input value is one of a third set of numeric input values and, in response, returning a second numeric solution value that is the solution to the first arithmetic function given any one of the third set of numeric input values;
wherein each of the first set of numeric input values is numerically larger than any of the second set of numeric input values; and
wherein each of the first set of numeric input values is numerically smaller than any of the third set of numeric input values.

13. The microprocessor of claim 8, wherein either: (1) each column or (2) each row of the array comprises:
a first cell having stored therein a first numeric solution value, from the first set of numeric solution values, which is the solution to the first arithmetic function given a first input numeric value, from the first set of numeric input values; and
a second cell having stored therein a second numeric solution value, from a second set of numeric solution values, which is a solution to a second arithmetic function given the first input numeric value, from the first set of numeric input values.

14. A computing device comprising:
one or more processing units;
a first computer-readable storage medium having an array encoded thereon, the array comprising a first set of numeric solution values, wherein each numeric solution value, in the first set of numeric solution values, is a solution to a first arithmetic function given a specific, unique numeric input value of a first set of numeric input values, the first set of numeric solution values being stored in the array such that each cell of the array corresponds to one of the input numeric values, from the first set of numeric input values, and has stored therein a numeric solution value, from the first set of numeric solution values, which is the solution to the first arithmetic function given the corresponding one of the input numeric values; and
a second computer-readable storage medium comprising computer-executable instructions which, when executed by the one or more processing units, cause the computing device to:
receive a request to perform the first arithmetic function for a first provided numeric input value;
contingent upon the first provided numeric input value being one of the first set of numeric input values, identify a cell of the array corresponding to the first provided numeric input value and provide, in response to the request, the numeric solution value, from the first set of numeric solution values, that is stored in the identified cell;
contingent upon the first provided numeric input value being one of a second set of numeric input values, provide a first numeric solution value that is the solution to the first arithmetic function for each of the second set of numeric input values, wherein the first and second sets of numeric input values are wholly exclusive of one another;
wherein each numeric input value, of the first and second sets of numeric input values, is represented by a predefined quantity of bits in accordance with a predefined computer number format;

wherein the first set of numeric input values, and, separately, the second set of numeric input values are contiguous such that, given the predefined quantity of bits, the predefined computer number format cannot represent another numeric value between two adjacent input numeric values of the first set of numeric input values or between two adjacent input numeric values of the second set of numeric input values.

15. The computing device of claim 14, wherein the first computer-readable storage medium is a ROM.

16. The computing device of claim 14, wherein the first computer-readable storage medium is a RAM; and wherein further the second computer-readable storage medium comprises further computer-executable instructions which, when executed by the one or more processing units, cause the computing device to read the array from the second computer-readable storage medium and load it into the RAM.

17. The computing device of claim 14, wherein the second computer-readable storage medium comprises further computer-executable instructions which, when executed by the one or more processing units, cause the computing device to:

generate, for the first set of numeric input values, the first set of numeric solution values; and store the first set of numeric solution values into the array.

18. The computing device of claim 14, wherein either: (1) each column or (2) each row of the array comprises:

a first cell having stored therein a first numeric solution value, from the first set of numeric solution values, which is the solution to the first arithmetic function given a first input numeric value, from the first set of numeric input values; and a second cell having stored therein a second numeric solution value, from a second set of numeric solution values, which is a solution to a second arithmetic function given the first input numeric value, from the first set of numeric input values.

19. The computing device of claim 14, wherein the provided first numeric solution value is one of: a maximum value representable with the predefined quantity of bits by the computer number format, a minimum value representable with the predefined quantity of bits by the computer number format, or zero.

20. The computing device of claim 14, wherein the second computer-readable storage medium comprises further computer-executable instructions which, when executed by the one or more processing units, cause the computing device to:

contingent upon the first provided numeric input value being one of a third set of numeric input values, providing a second numeric solution value that is the solution to the first arithmetic function for each of the third set of numeric input values;

wherein each of the first set of numeric input values is numerically larger than any of the second set of numeric input values; and wherein each of the first set of numeric input values is numerically smaller than any of the third set of numeric input values.

* * * * *